United States Patent [19]

Kestenbaum et al.

[11] Patent Number: 5,422,493
[45] Date of Patent: Jun. 6, 1995

[54] ASYNCHRONOUS BIDIRECTIONAL NODE SWITCH

[75] Inventors: Ami Kestenbaum, West Windsor Township; Richard S. Armington, Hopewell, both of N.J.

[73] Assignee: National Center for Manufacturing Sciences, Inc., Ann Arbor, Mich.

[21] Appl. No.: 103,099

[22] Filed: Aug. 9, 1993

[51] Int. Cl.6 ............................................. G02B 27/00
[52] U.S. Cl. .................... 250/551; 250/227.22
[58] Field of Search ............. 250/551, 227.22, 227.11; 307/311; 359/128, 139

[56] References Cited

U.S. PATENT DOCUMENTS

| | | | |
|---|---|---|---|
| 4,088,387 | 5/1978 | Lewis | 350/96.15 |
| 4,223,217 | 9/1980 | Bongard et al. | 250/227 |
| 4,491,792 | 1/1985 | Bullock et al. | 324/157 |
| 4,878,729 | 11/1989 | Stewart | 350/96.18 |
| 5,045,709 | 9/1991 | Ogawa | 250/551 |

OTHER PUBLICATIONS

Signetics; *High-Speed CMOS Data Manual 1986*, pp. 7-592-7-604.

Primary Examiner—David C. Nelms
Assistant Examiner—Steven L. Nichols
Attorney, Agent, or Firm—Gifford, Krass et al.

[57] ABSTRACT

A node switch useful for resource sharing within a network environment incorporating computer control uses opto-electronic isolators and switching devices to route bidirectional communications between a common port and at least two I/O ports on an asynchronous basis. Separate power supplies are used for the ports and the internal circuitry, thus providing signal matching between disparate pieces of equipment. Multiple node switches may be cascaded or "daisy-chained" to provide for flexible switching, depending upon the application.

5 Claims, 3 Drawing Sheets

ENABLE

| A - B | C - D | A | B | C | D |
|---|---|---|---|---|---|
| 0 | 0 | - | - | - | - |
| 1 | 0 | * | * | - | - |
| 0 | 1 | - | - | * | * |
| 1 | 1 | * | * | * | * |

ASYNCHRONOUS BIDIRECTIONAL NODE SWITCH

FIELD OF THE INVENTION

This invention relates generally to electrical switches, and, in particular, to an optically isolated asynchronous bidirectional node switch useful for resource sharing.

BACKGROUND OF THE INVENTION

In sophisticated electronics systems such as those directed toward communications and industrial control, it is quite often the case that system integrators are confronted with disparate devices or resources which must be shared or multiplexed with one another. Interconnecting such equipment to facilitate efficient and straightforward operation may be a difficult task. In the industrial control environment, for example, networks are often employed to interconnect peer equipment under global control through a centralized computer system. Such a configuration may suffice in a simple system, but as the sophistication of the application increases, signal contention may arise especially if one piece of equipment must be shared by others. The conventional solution is to route all signals through a central computer which manages this contention. However, such a solution can introduce significant signal propagation delay, which tends to inhibit peer-to-peer communication among equipment controllers. This, in turn, lowers overall system efficiency.

Apart from high-level considerations such as the overall architecture used within an industrial control environment, low-level considerations also play a role in determining the success of a system integration involving equipment or resources from various manufacturers. For example, the voltage levels, polarities and current demands associated with a particular controlling device or apparatus may render it incompatible with other pieces of equipment. To maximize system efficiency, high-speed communication must occur directly between the various controllers and industrial resources rather than suffering propagation delays associated with routing through a centralized computer. An efficient architecture will impose a control mechanism upon these tools or resources without interfering with their communication links, once established.

Multiplexer-type circuits are available, but for several reasons are of limited utility for the specific problems herein addressed. Generally speaking, such devices only support 1-to-n or n-to-1 interconnections. As a consequence, simultaneous, asynchronous, bidirectional multi-wire connections among multiple resources are not easily realized. So-called analog multiplexer/demultiplexers, for example, while incorporating enable inputs to control communication between multiple, independent input/output (I/O) paths, rely on MOSFET-based transmission gates and, as such, do not perform requisite voltage/polarity matching. Moreover, it may be desirable to couple more than one I/O port to a common port simultaneously, a feature which is ordinarily undesirable with true multiplexing. Perhaps most importantly, independent bidirectional communication mandates the coupling of at least two lines per connection, facilitating simultaneous two-way transmission independent of the ground plane, a feature not offered with presently available digital or analog multiplexers.

Thus, there remains a need for a switching device which can facilitate and manage asynchronous peer-to-peer bidirectional communication. To take into account equipment or resources available from various manufacturers, such a switch would additionally perform signal level and polarity matching to ensure compatibility. An ideal switching unit would provide a modular building block to be connected in a variety of configurations so as to provide flexibility of network design, including daisy-chained, bussed, and hybrid architectural configurations.

SUMMARY OF THE INVENTION

The present invention solves the problems inherent with peer-to-peer communication within a centralized control environment by supporting asynchronous, bidirectional communication system resources. This is carried out by implementing a control structure that maximizes system efficiency by minimizing propagation delay and preserving high-speed peer-to-peer communication. In its most basic and preferred embodiment, the present invention takes the form of a node switch comprising a first bidirectional port, a second bidirectional port and a third bidirectional port, the third port being common to the first two ports. A first gating circuit controlled by a first enable input is operative to place the first bidirectional port in two-way asynchronous communication with the common bidirectional port, but these two ports and indeed all ports, are at all times electrically isolated from one another in both directions, thus achieving the requisite signal level and polarity matching required with disparate resources. A second gating circuit, controlled by a second enable input, places the second bidirectional port in two-way communication with the common port in much the same way as the first enable selects the first bidirectional port.

The preferred embodiment utilizes optical isolation to facilitate signal level and polarity matching between the common port and the first and second input/output (I/O) ports. As such, a total of six optical isolators are utilized, one associated with each direction for each port. An electrically activated gating circuit is used to couple the input to the common port to the output of the first bidirectional port when the associated enable signal is asserted and, at the same time, the first I/O port's input signal is likewise coupled to the output of the common port. In like manner, a separate gating circuit is used to couple the common port's input to the output of the second I/O port when the enable signal associated with that port is asserted, and simultaneously to couple the input of the second I/O port to the output of the common port. Four power supplies may be employed in embodiments of the invention, one for each of the I/O ports, including the common port, and a fourth power supply associated with the switch itself, including the gating circuitry.

In the preferred embodiment, commercially available optical isolators are used in conjunction with commercially available selection devices to implement the present invention, referred to herein as a "node switch," with these circuits being mounted on a standard printed-circuit board. While the preferred embodiment enables the common port to communicate with two I/O ports, the present invention anticipates one port being common to more than two I/O ports either by direct selection or by cascading circuits having one common port shared between two I/O ports. Moreover, while the preferred embodiment incorporates integrated-circuit (IC) components on a printed-circuit board, it is recognized that partial or complete monolithic integration of the opto-electronic devices and gating circuits may result in cost benefits for certain applications.

DETAILED DESCRIPTION OF THE PREFERRED EMBODIMENT

The present invention embodies a unique method by which peer-to-peer asynchronous bidirectional communication may take place in a hierarchically controlled manufacturing environment. The present invention is not limited to manufacturing applications, however, this type of communication is required in many applications that demand close coupling between equipment and/or controller. Indeed, as the node switch of the present invention can perform signal matching on a per-port/per-line basis, and since these switches may be expanded and cascaded, the present invention anticipates application in any computer switched real time digital signal network.

Figure 1:
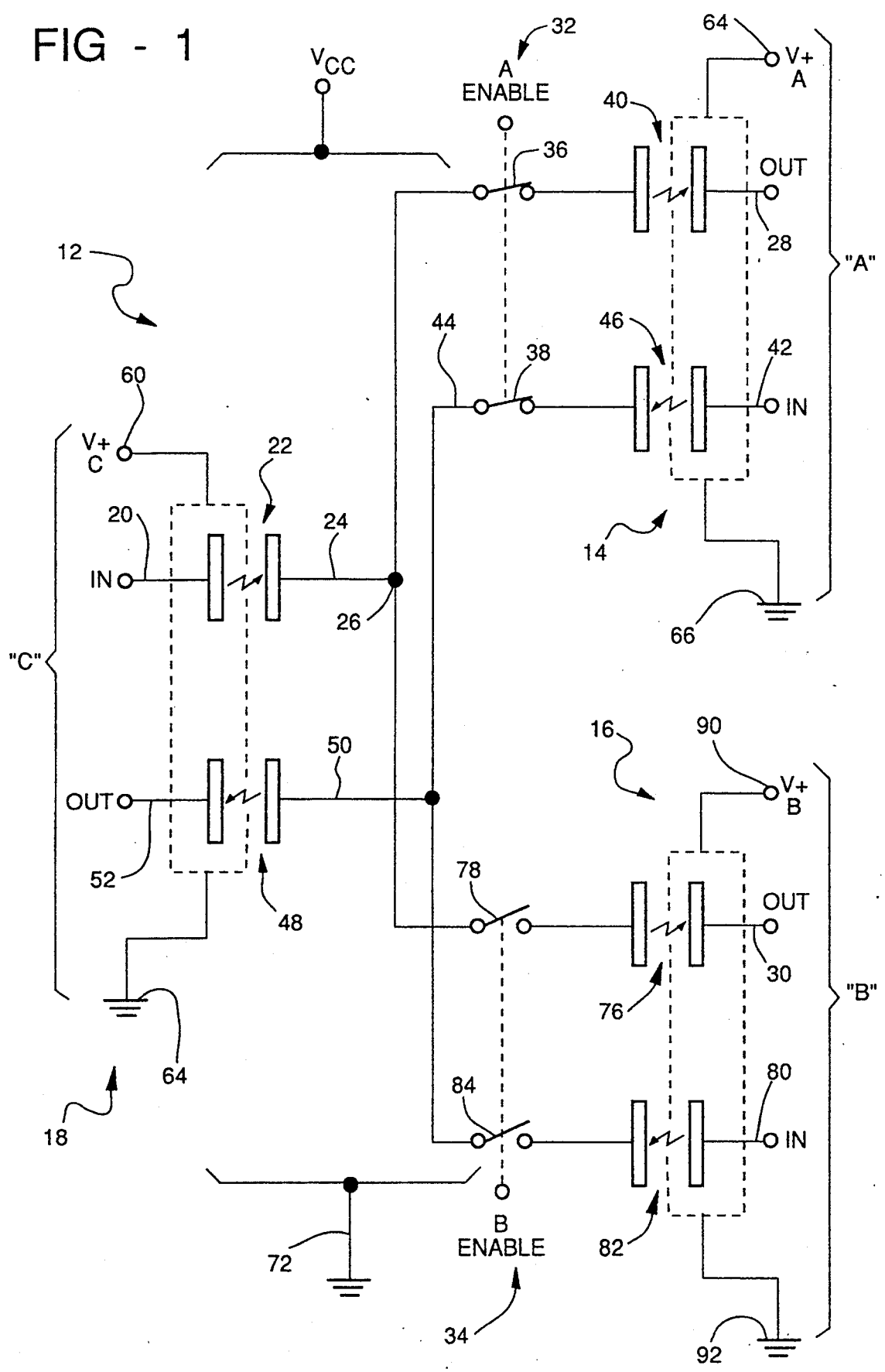
FIG. 1 is a block diagram of a preferred embodiment of the node switch of the present invention wherein a common bidirectional port is able to asynchronously communicate with two I/O ports.

Turning now to the figures, FIG. 1 illustrated in block diagram form, a node switch, indicated generally at 12, having a first I/O port "A" indicated generally at 14, and a second I/O port "B" indicated generally at 16, shared between I/O port "C," indicated generally at 18. Beginning with reference to the common port C, an input signal line 20 carries information in a first direction to an electrical isolator 22 which couples the Signal on line 20 to line 24. In the preferred embodiment, an optical isolator is used for this purpose, though any type of electrical isolation unit may be utilized. The signal, having been coupled to line 24, is split at point 26, where it may be fed either to the output line of port A at 28 or the output line of port B at 30, depending upon the status of the A enable input 32 and B enable input 34. In this illustration, the A enable signal is asserted, thus closing switches 36 and 38. With switch 36 closed, the input signal coupled to path 24 is presented to opto-isolator 40, and is subsequently coupled to output line 28 of port A. With A enable 32 asserted, and switch 38 closed, an input signal at port A presented at point 42, is coupled to line 44 through switch 38 by opto-electronic coupler 46. Signal path 44 is presented to the input of opto-electronic coupler 48 along line 50, where it is coupled to the output path 52 of the common port C.

It should be noted that even for two-way communication between the common port and one of the two I/O ports, three power supplies must be taken into consideration. First, the common port C utilizes its own power supply represented by $V_C+$ shown at 60 and ground 62. Port A uses power supply $V_A+$ shown at 64 and its own ground 66, and the enabling circuitry driving switches 36 and 38, utilizes its own supply represented by $V_{cc}$, 70, and ground, 72. Also, while the circuit depicted shows positive supplies referenced to separate ground, the present invention anticipates bidirectional communication requiring positive and negative supplies referenced to ground, and these supplies may be associated with any of the ports or the internal enabling switches, as all of these circuits are independent. Moreover, should any of the supply and/or current requirements for any of the I/O ports or the switching circuitry be common, fewer power supplies may be used.

With the B enable line 34 asserted, I/O port B communicates with the common port in the same way as just described for I/O port A, that is, an input present at common port line 20 splits at line 26 and is coupled to the output line 30 through switch 78 and opto-electronic isolator 76, and an input on line 80 is coupled through opto-electronic coupler 82 and switch 84 where it is routed along line 50 to coupler 48 to serve as an output at the common port along line 52. The power supply for the B I/O port is also independent as represented by $V_B+$ 90 and a separate ground 92.

Figure 2:
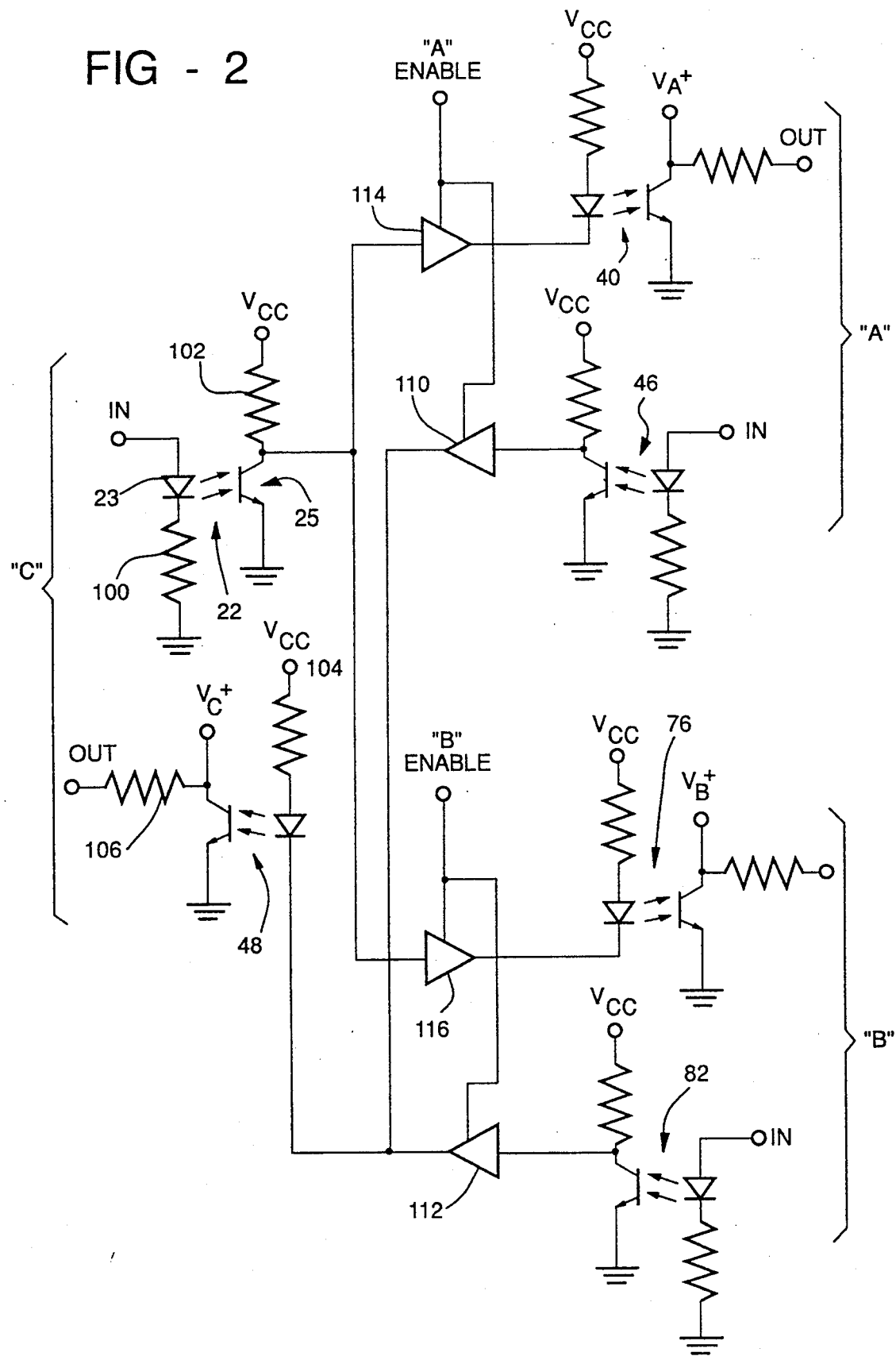
FIG. 2 is a schematic diagram of the device of FIG. 1 showing preferred component selections.

FIG. 2 is a schematic diagram which references more specific componentry of the preferred embodiment. For example, the opto-isolators in FIG. 1 at 22, 40, 46, 48, 76 and 82 may be implemented with commercially available opto-electronic couplers such as the ILD 252 dual opto-electronic coupler or ILQ 55 quad opto-electronic coupler available from Siemens Corp. These couplers include a light emitting diode shown, for example, at 23 which couples optical radiation to a photosensitive transistor 25. In the preferred embodiment, the input portion of the opto-electronic coupler is in series with current limiting resistor 100, and the transistor output portion of the opto-electronic coupler takes advantage of current limiting resistor 102. Note that this resistor is connected to Vcc, the supply used for the internal switching devices only, and not those supplies associated with any of the I/O ports.

The output section of port C also uses a diode/transistor opto-electronic coupler shown at 48 along with current limiting resistors 104 on the diode side and 106 on the output path. I/O ports A and B also use opto-electronic couplers shown at 40, 46, 76 and 82. In the preferred embodiment, current limiting resistors are used at the input and output sections of the A and B ports as well. As for the enable circuitry, in the preferred embodiment a TTL-type driver such as the 74LS244 may be used, as it contains eight tri-state drivers applicable to this purpose. As such, only one half of the devices required for a node switch with two drivers associated with the common port output line, these drivers shown at 110 and 112, and two drivers associated with the common port input line as shown with drivers 114 and 116. As noted previously, while the preferred embodiment takes advantage of IC components mounted on a printed-circuit board, variations in the IC components selected and the option to monolithically integrate part or all of the mode switch onto a single integrated circuit is possible, depending upon cost effectiveness.

Figures 3A, 3B:
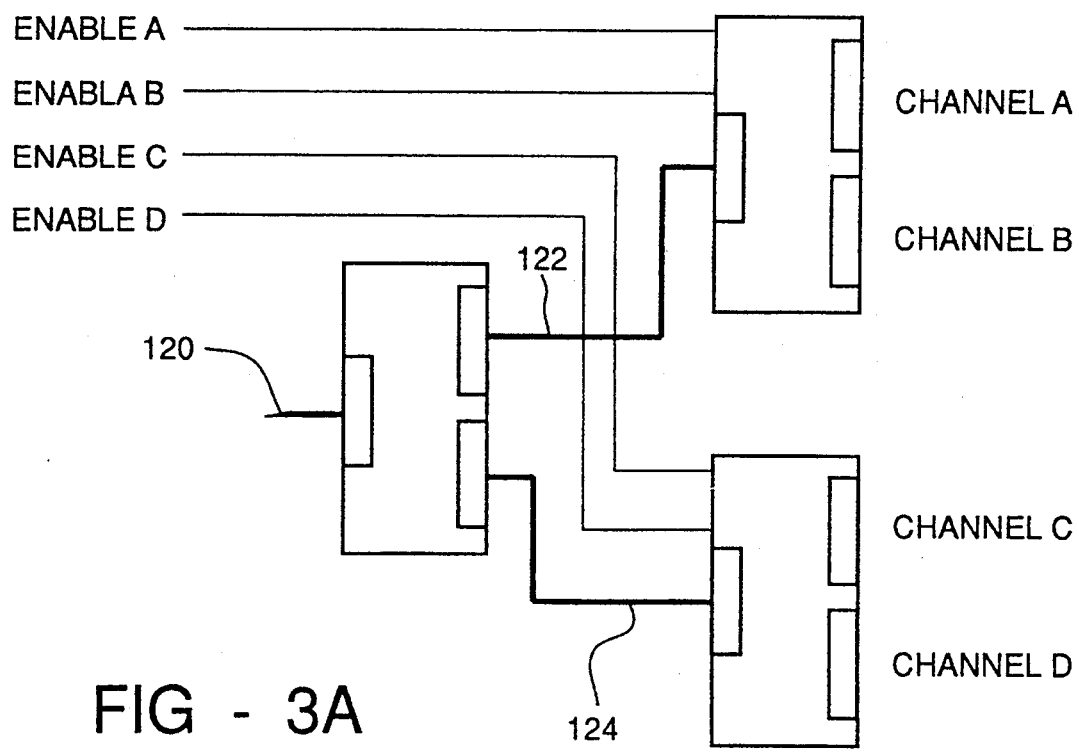
FIGS. 3A and 3B are a block diagram and a truth table of a form of the invention wherein three node switches may be daisy-chained to provide real-time (one at a time) switching with four enable lines.

Turning now to FIG. 3, there is shown a block diagram wherein three node switches may be cascaded to provide 1-to-4 switching. In this case, a signal present along two-way path 120 may be routed along bidirectional path 122 or 124 depending upon the status of enable inputs A/B or enable inputs C/D as shown in the accompanying truth table.

Having thus described our invention, we claim:
1. A node switch, comprising:
   a first bidirectional port;

a second bidirectional port;

a third bidirectional port;

a first gating circuit controlled by a first enable input, the gating circuit being operative to place the first bidirectional port in electrically isolated communication with the third bidirectional port; and a second gating circuit controlled by a second enable input, the gating circuit being operative to place the second bidirectional port in electrically isolated communication with the third bidirectional port.

2. A node switch of claim 1 wherein optical isolation is used to electrically isolate the bidirectional ports.

3. A node switch, comprising:

a first bidirectional port coupled to an electrically isolated input path and an electrically isolated output path;

a second bidirectional port coupled to an electrically isolated input path and an electrically isolated output path;

a third bidirectional port coupled to an electrically isolated input path and an electrically isolated output path;

a first gating circuit controlled by a first enable input, the gating circuit being operative to place the electronically isolated input path of the first bidirectional port in communication with the electrically isolated output path of the third bidirectional port and place the electrically isolated input path of the third bidirectional port in communication with the electrically isolated output path of the first bidirectional port; and a second gating circuit controlled by a second enable input, the gating circuit being operative to place the electrically isolated input path of the second bidirectional port in communication with the electrically isolated output path of the third bidirectional port, and place the electrically isolated input path of the third bidirectional port in communication with the electrically isolated output path of the second bidirectional port.

4. A node switch, comprising:

a first bidirectional port having an input and an output;

a first coupling device having an input and an output, the device being operative to generate at its output an electrically isolated representation of the signal present at its input, the input of the first device being connected to the input of the first bidirectional port;

a second coupling device having an input and an output, the device being operative to generate at its output an electrically isolated representation of the signal present at its input, the output of the second device being connected to the output of the first bidirectional port;

a second bidirectional port having an input and an output;

a third coupling device having an input and an output, the device being operative to generate at its output an electrically isolated representation of the signal present at its input, the input of the third device being connected to the input of the second bidirectional port;

a fourth coupling device having an input and an output, the device being operative to generate at its output an electrically isolated representation of the signal present at its input, the output of the fourth device being connected to the output of the second bidirectional port;

a third bidirectional port having an input and an output;

a fifth coupling device having an input and an output, the device being operative to generate at its output an electrically isolated representation of the signal present at its input, the input of the fifth device being connected to the input of the third bidirectional port;

a sixth coupling device having an input and an output, the device being operative to generate at its output an electrically isolated representation of the signal present at its input, the output of the fifth device being connected to the output of the third bidirectional port; and selection circuitry having a first enable input associated with the first bidirectional port and a second enable input associated with the second bidirectional port, the selection circuitry being operative with the first enable asserted to place the output of the third signal coupling device in electrical communication with the input of the second signal coupling device and to place the output of the first signal coupling device in electrical communication with the input of the fourth signal coupling device, and, with the second enable asserted, to place the output of the fifth signal coupling device in electrical communication with the input of the second signal coupling device and to place the output of the first coupling device in electrical communication with the input of the sixth signal coupling device.

5. A node switch, comprising:

a plurality of opto-electronic couplers, each coupler having an optical emitter;

an inwardly driven connection to the optical emitter;

a light sensitive device disposed to receive the optical output of the emitter operative to convert it into an electrical signal; and an output for said electrical signal;

a plurality of independent bidirectional ports, each having an input signal line connected to the input of one of said opto-electronic couplers and an output signal line connected to the output of one of said opto-electronic couplers;

a common bidirectional port having an input signal line connected to the input of one of said opto-electronic couplers and an output signal line connected to the output of one of the opto-electronic couplers; and switching circuitry connected to each independent bidirectional port, the circuitry including an enable input operative to interconnect the output of its associated port with the input of the common port and the output of the associated port to the input of a selected bidirectional port through their respective opto-electronic couplers.

* * * * *